United States Patent [19]

Santora

[11] 4,438,988
[45] Mar. 27, 1984

[54] VERTICAL BEARING ASSEMBLY

[76] Inventor: Frank Santora, 2301 N. Grant Ave., Wilmington, Del. 19806

[21] Appl. No.: 301,987

[22] Filed: Sep. 14, 1981

Related U.S. Application Data

[63] Continuation-in-part of Ser. No. 188,616, Sep. 19, 1980, Pat. No. 4,357,015.

[51] Int. Cl.³ .............................................. F16C 19/49
[52] U.S. Cl. .................................... 308/174; 308/230
[58] Field of Search ............... 308/174, 207 R, 189 R, 308/194, 229, 219, 230, 233, 231, 227; 384/243, 384, 244, 245

[56] References Cited

U.S. PATENT DOCUMENTS

| | | | |
|---|---|---|---|
| 2,063,787 | 12/1936 | Brown | 308/174 X |
| 2,229,969 | 1/1941 | Goss | 384/244 |
| 2,606,084 | 8/1952 | Larsen et al. | 308/174 |
| 2,919,963 | 1/1960 | Mims | 308/174 X |
| 3,731,985 | 5/1973 | De Gaeta | 308/194 |

Primary Examiner—Stuart S. Levy
Assistant Examiner—David Werner
Attorney, Agent, or Firm—Mortenson & Uebler

[57] ABSTRACT

A low friction, vertical bearing assembly is provided having an upper vertical load-bearing shaft extending into a bearing housing containing two ball bearings, one ball bearing being oriented above and in contact with the other in the housing, the upper shaft having a lower, concave end resting upon the top of the upper ball bearing, the concave end being substantially of the contour of the ball bearing, the lower left ball bearing resting upon a lower, substantially vertical load-bearing shaft which has a concave upper end, the concave end being substantially of the contour of the lower ball bearing, and a plurality of needle bearings contained within the housing and oriented substantially vertically around the periphery of the ball bearings, whereby a bearing assembly is provided having extremely low rotational friction.

3 Claims, 15 Drawing Figures

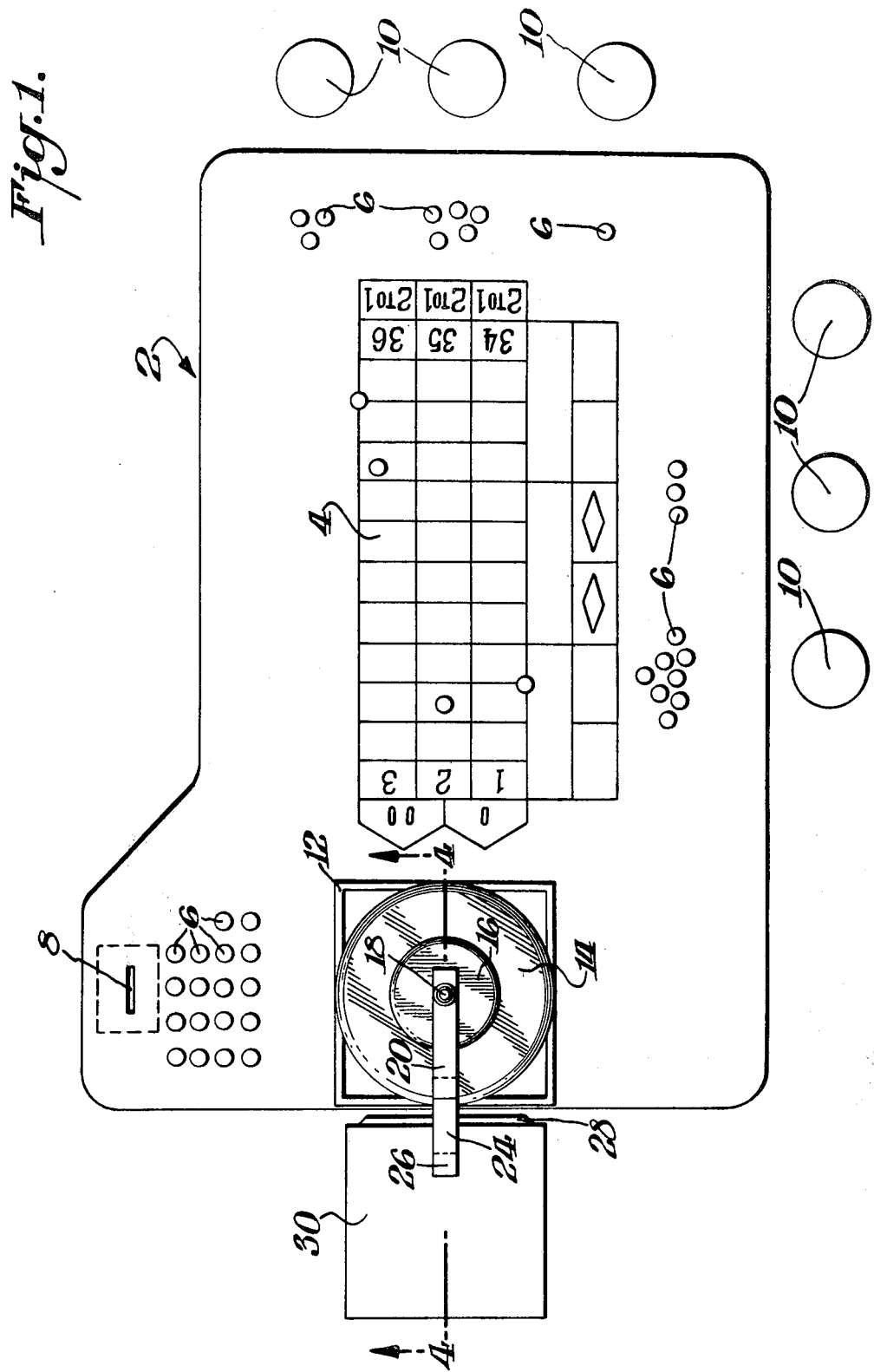

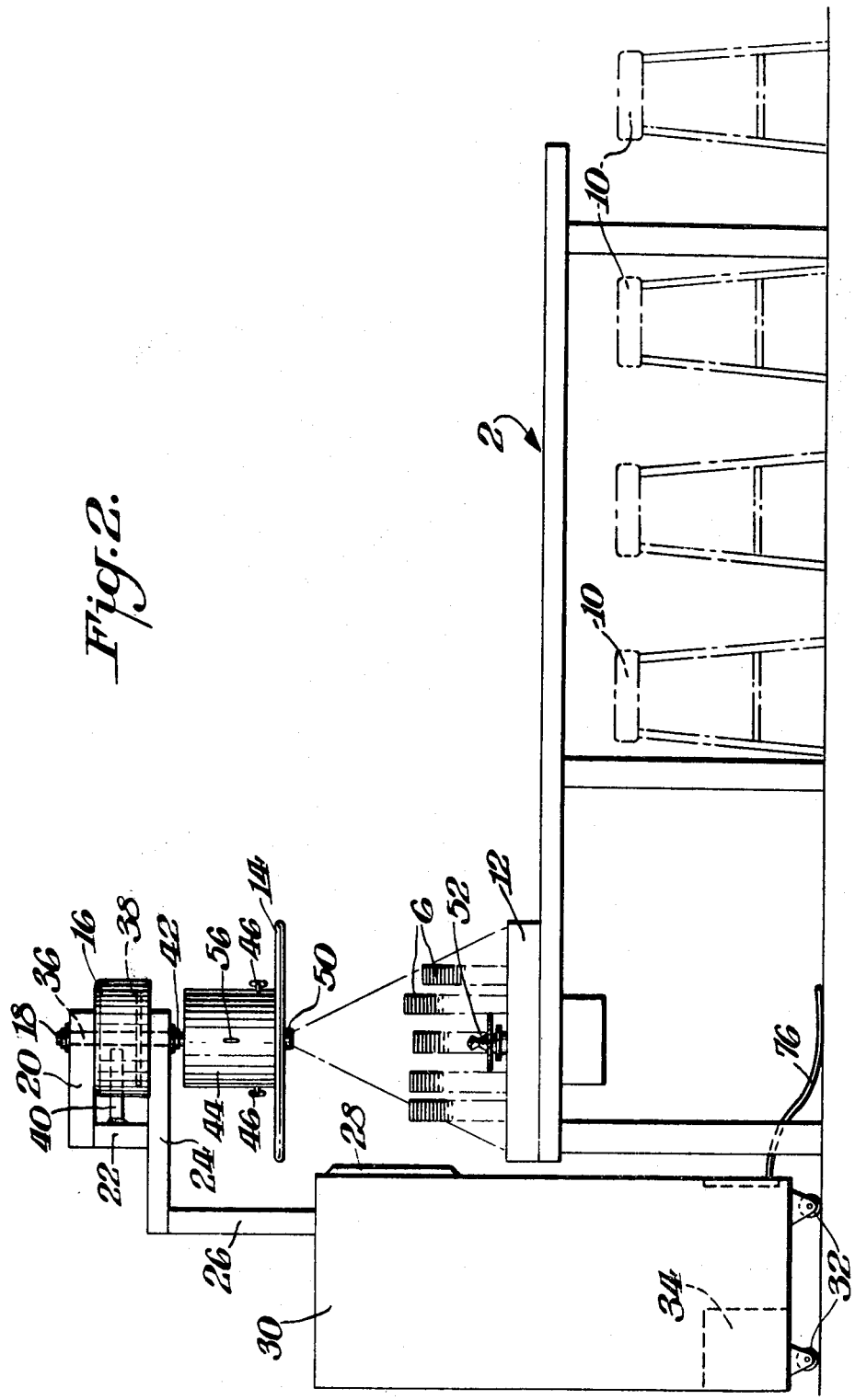

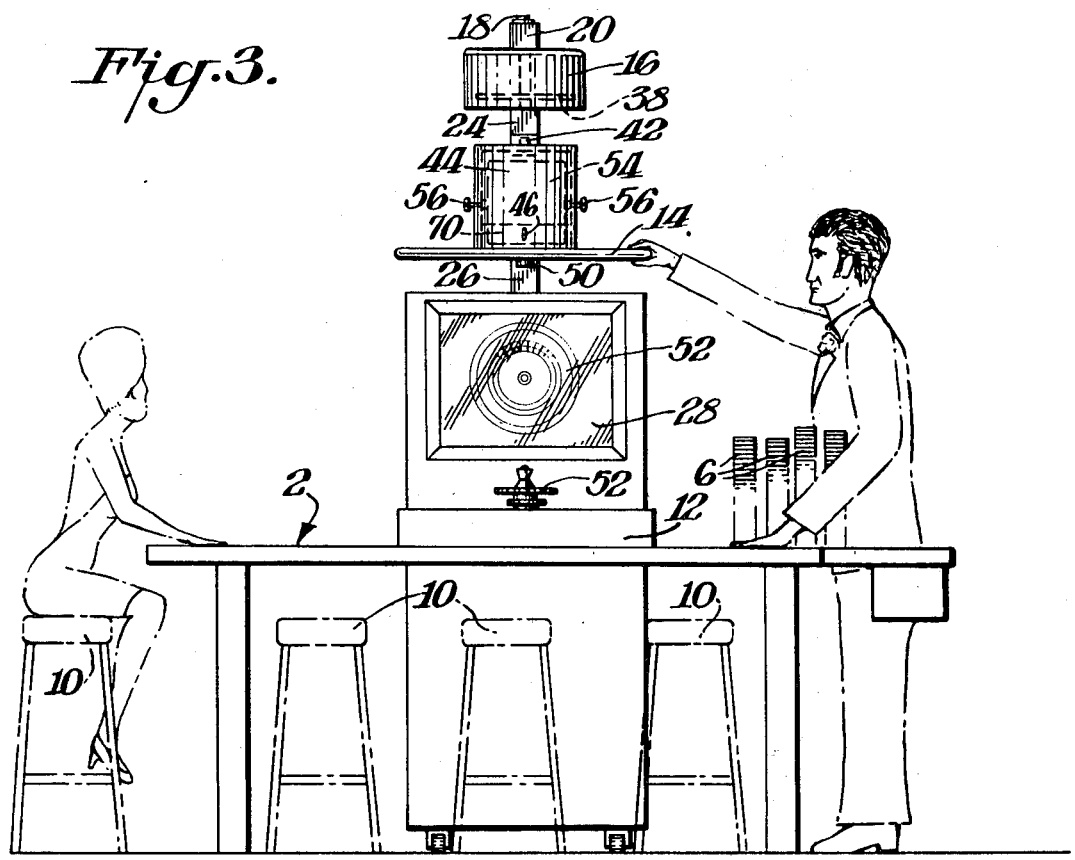
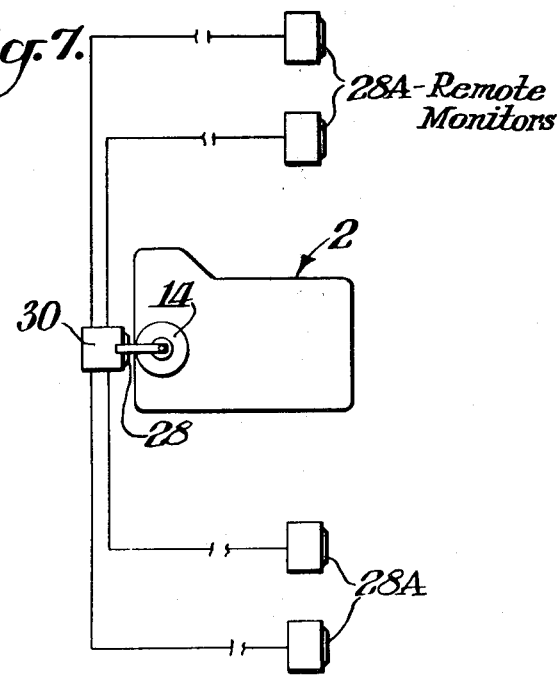

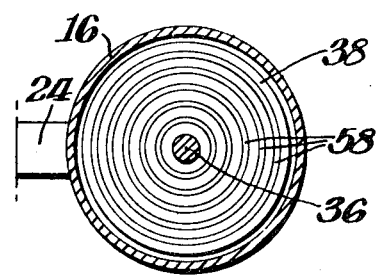
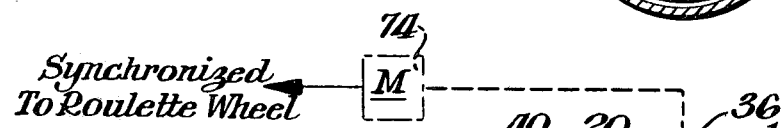
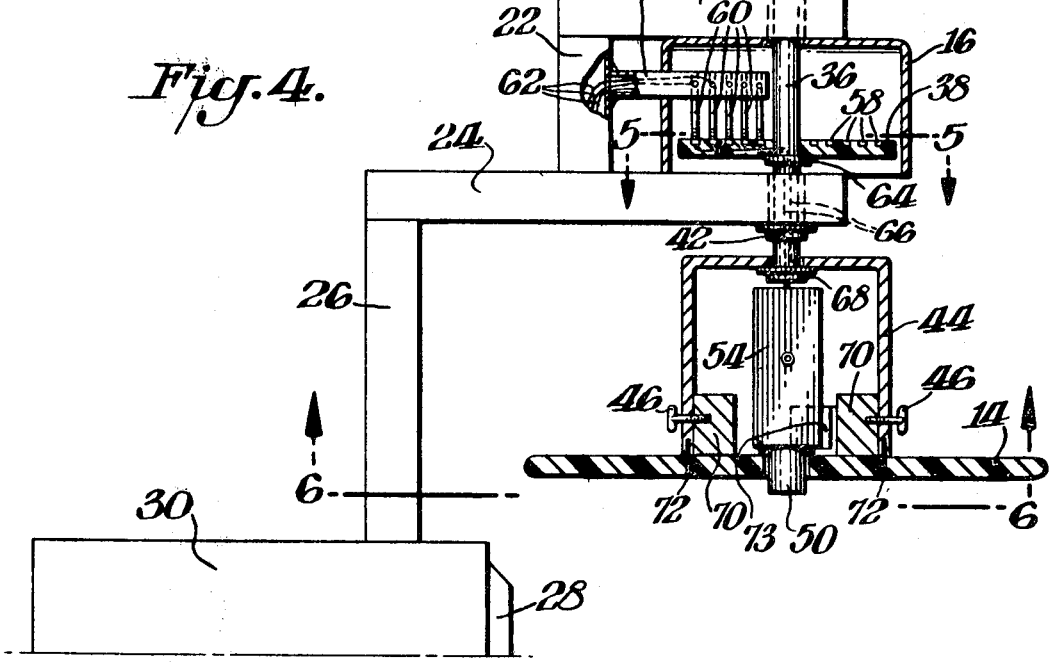
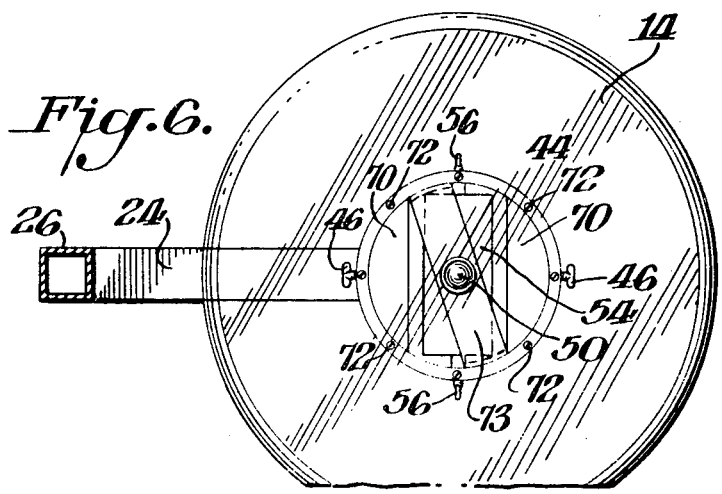

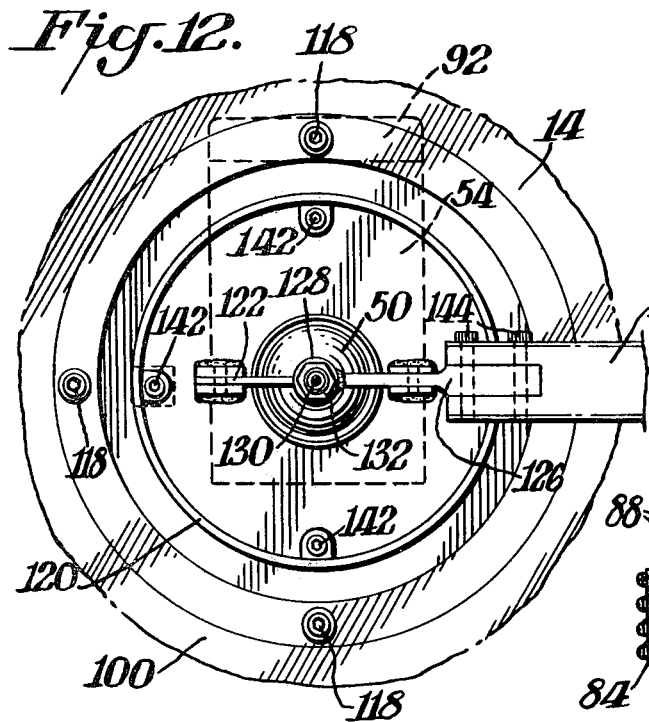
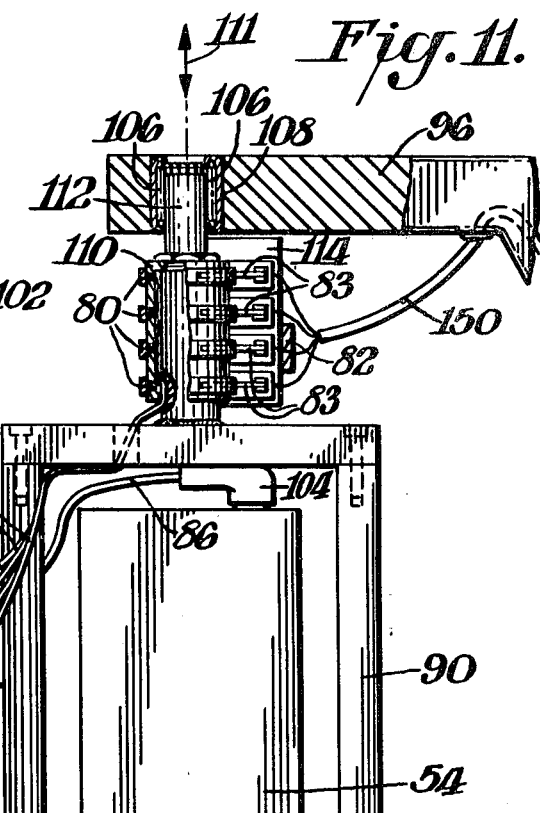
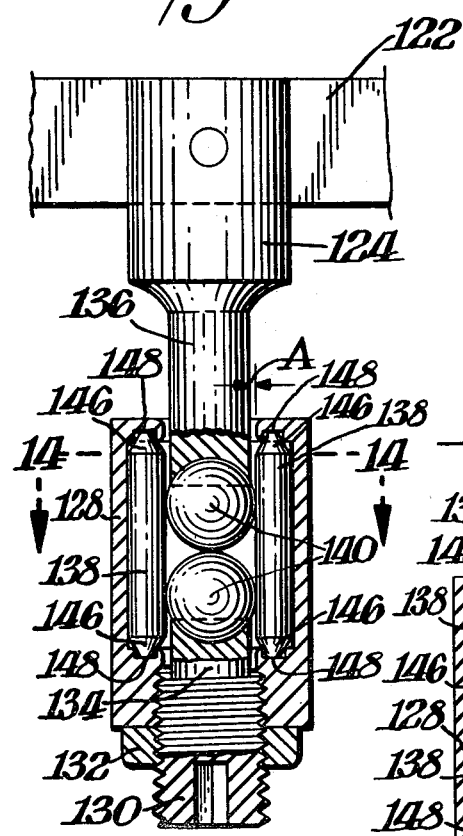
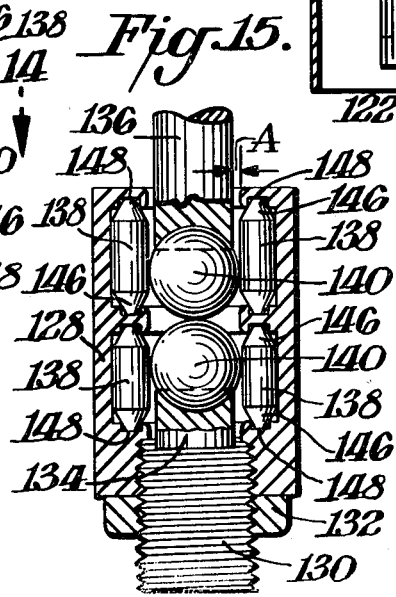
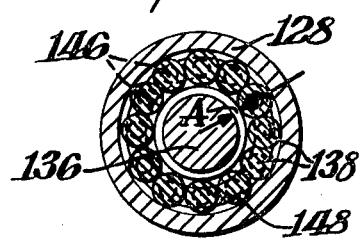

4,438,988

VERTICAL BEARING ASSEMBLY

CROSS REFERENCE TO RELATED APPLICATION

This application is a continuation-in-part of pending application Ser. No. 188,616, filed Sept. 19, 1980, now U.S. Pat. No. 4,357,015.

BACKGROUND OF THE INVENTION

In the game of roulette, a wooden, precision gimballed wheel with the numbers 1 through 36 and "0" and "00" embossed on the rim and having individual slots corresponding to each number is used. The numbers are normally alternately red and black and the zeros are green.

The roulette wheel is normally located embedded in one end of a table, and on the table a betting layout is marked having the same numbers found on the wheel. The betting layout includes additional sections which may be used for side bets.

Prior to spinning the wheel, bets are placed by the players on chosen numbers, and the wheel is spun by the croupier. The croupier then drops or flips a small ivory ball, sending it spinning around the rim of the stationary rimmed wheel in the direction opposite the direction of wheel rotation. From this instant in time, the wheel spins and the ball travels the rim until the momentum of the ball is sufficiently slowed due to frictional and gravity forces that it falls from the rim, strikes one or more raised obstacles set into the wheel, and finally falls into one of the numbered slots. When the wheel has slowed sufficiently for the croupier to see which number is the winner, he places his marker on the winning number on the betting layout, collects the losing bets and distributes the payout of the winning bets. The time between the instant the croupier initially drops the ball to the instant he places his marker can be more than a minute.

During the time the wheel and ball are spinning, there is a lull in the action. Because of their seating location, the players can not see the spinning wheel clearly. The croupier, who stands adjacent the spinning wheel, is the only person at the roulette table who has a clear view of the wheel.

The number of bets that can be placed in any given time period is limited by the time delay during which ball and wheel are spinning. Bets can be placed at any time after the previous betting layout is cleared and all bets are paid. Betting stops when the croupier says "No more bets."

The simplest bet in roulette is a one-number bet in which a chip is placed on a single number including "0" and "00" (in European casinos there is no "00"). Every bet loses if either "0" or "00" comes up if a player is not wagering on same. The payoff in a winning one-number bet is 35 to 1. Thus, on the average, since there are thirty-eight slots on the wheel (thirty-seven in Europe), for every thirty-eight spins the house wins thirty-seven times and loses once (thirty-six wins and one loss in thirty-seven spins in Europe). Since the payout is 35 to 1 on the one loss by the house, the house advantage, assuming a perfect unbiased wheel is 2/38ths or 5.26% (2.70% in Europe). The house "take" is thus the product of the total amount of bets, the number of spins per unit time, the time period of play, and 5.26%, again averaged over a relatively long period of time to eliminate random errors. It is thus clear that if the number of spins per unit time is increased, the house "take" is increased.

SUMMARY OF THE INVENTION

Apparatus is provided for viewing the ball in a game of roulette at the instant the ball drops into a numbered slot on the roulette wheel comprising: (a) a television camera mounted above a conventional roulette wheel, and being focused upon the wheel, (b) means for rotating the camera about an axis extending substantially vertically through the center of the wheel and enabling rotation of the camera about the axis at substantially the same rotational speed as the wheel during the play of the game, and maintaining focus of the camera on the wheel during play of the game, and (c) means for transmitting the signals from the camera during rotation of camera and wheel to at least one stationary television receiving monitor in view of the players of the game.

When the roulette wheel is spun and play is begun, the camera rotating at substantially the same speed as the wheel causes a substantially still image of the wheel on the monitor, and the roulette ball appears on the monitor the instant that it drops into a numbered slot on the wheel.

Rotation of the camera focused upon the roulette wheel can be provided manually by the croupier or by a synchronous motor drive controlled by rheostat adjustment.

The television monitors can be located both at the roulette table itself to make the play of the participating players more exciting or they can be located in remote areas such as the hotel rooms in the casino, whereby remote persons could view the game. Electronic means such as are known in the prior art could be provided to enable the remote persons to bet and become players.

The apparatus of this invention can be used to continuously view and monitor virtually any type of rotating graphic display.

In a preferred embodiment, a new, low-friction bearing assembly is provided.

BRIEF DESCRIPTION OF THE DRAWINGS

FIG. 1 is a top plan view of the apparatus of this invention located adjacent a conventional roulette table, also shown in top plan view.

FIG. 2 is a side elevation of the apparatus of this invention and conventional roulette table and wheel.

FIG. 3 is a front elevational view of the apparatus of this invention showing an image of the spinning roulette wheel being displayed on the television monitor in view of the player seated at the table and the croupier.

FIG. 4 is a side elevation, in part cross-section and in part broken away, of the apparatus of this invention taken along line 4—4 of FIG. 1.

FIG. 5 is a top plan view of the collector ring wheel and collector rings of this invention taken along line 5—5 of FIG. 4.

FIG. 6 is a bottom plan view of the wheel of this invention used to rotate the camera along line 6—6 of FIG. 4.

FIG. 7 is a top plan view of the apparatus of this invention showing television receivers located at areas remote from the roulette table and wheel, which receivers are displaying the action of the wheel.

FIG. 11 is an enlarged side elevation, in part broken away and in part cross-section of the preferred camera, electrical switching and bearing assembly of this invention.

FIG. 12 is a bottom plan view of the preferred embodiment of FIG. 8.

FIG. 13 is an enlarged side elevation, in part cross-section, of the new bearing assembly of this invention.

FIG. 14 is a cross-section of the new bearing assembly of this invention taken along line 14—14 of FIG. 13.

FIG. 15 is an alternate embodiment of the new bearing assembly of this invention.

Figure 10:
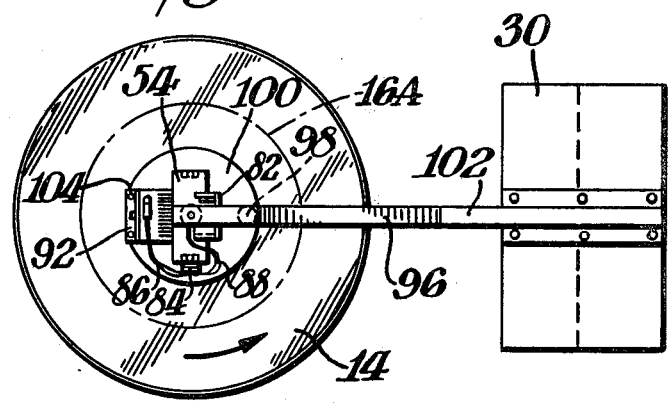
FIG. 10 is a top plan view of the preferred embodiment of FIG. 8.

DETAILED DESCRIPTION OF THE INVENTION AND PREFERRED EMBODIMENTS WITH REFERENCE TO THE DRAWINGS

An improved roulette game is provided wherein a television camera, preferably a color camera, focuses on the spinning roulette wheel and rotates with it, thereby sending either a slow motion or still image of the roulette wheel to at least one television receiver to monitor the spinning roulette wheel and display the wheel to participants or to remote areas. The apparatus enables the players and the croupier to watch the spinning wheel in slow or stop action and to see the ball fall into a numbered slot instantly on the monitor, thereby informing everyone of the winning number the instant the ball drops and generally making the game more spectacular and thrilling. The apparatus of this invention is also useful for viewing and monitoring rotating graphic displays of virtually any type. In addition, a novel and useful bearing assembly is provided.

The apparatus of this invention is best described with reference to the accompanying drawings wherein FIG. 1 shows a conventional roulette table 2 with the apparatus of this invention located adjacent thereto. On table 2 is shown the table betting layout 4, betting chips 6 located at players' positions 10 and at the croupier's position, and cash slot 8, also located at the croupier's position. Roulette wheel housing 12 in table 2 is shown located below wheel 14 which provides for camera rotation. Also shown in FIG. 1 are a housing 16 for the transmission circuitry for transmitting electrical signals from the television camera to the television monitor 28. Completing FIG. 1, top axle ball bearing assembly 18 is shown mounted in upper horizontal support bracket 20 for the electric housing 16, connected to horizontal support bracket 24 extending to cabinet 30 in which television receiver 28 is mounted.

FIG. 2 shows a side elevational view of the apparatus of this invention mounted adjacent roulette table 2. Players' seats 10 are shown arranged at table 2 and conventional roulette wheel 52 in wheel housing 12 is shown mounted in table 2. Chips 6 located at the croupier's position are shown for completeness.

Above the roulette wheel in FIG. 2 is shown television camera lens 50 protruding through the center of wheel 14. This camera is mounted within camera housing 44 and is rotatably secured to the supporting structure as shown by bottom ball bearing assembly 42, axle 36 and upper ball bearing assembly 18, all secured to upper horizontal support 20, vertical support 22, horizontal support 24 and vertical support 26 which extends to and is affixed to television receiver cabinet 30. Counterweight 34 and locking wheel means 32 provide balance and ease of moving and locking the assembly. The supports 20, 22, 24 and 26 can be hollow, tubular aluminum and wiring from camera to monitor and from power supply to camera can be conveniently carried within these supports. Power to the system is shown supplied from a conventional a.c. power supply through cord 76.

In FIG. 2 and within the electronic transmission circuitry housing 16 are shown wheel 38 containing electric collector rings, the wheel 48 being affixed to axle 36 and rotating therewith. Support 40 is shown affixed to vertical assembly 22 and extending into the electronic assembly housing 16. Support 40 is used to hold carbon brushes or the like for transmitting the electronic signals from the rotating collector rings to the stationary supporting structure and thence to television monitor 28. Support 40 is conveniently constructed from a plastic such as nylon or polyethylene or like suitable nonconducting material.

FIG. 3 shows, in front elevation, the apparatus of this invention in operation. A player is shown seated at one player position 10 and the croupier has just spun the roulette wheel 52 and the wheel 14 for providing rotation of the camera 54 at substantially the same rotational speed as roulette wheel 52. The croupier is shown making an adjustment of wheel 14 rotation to obtain substantially a still image of roulette wheel 52 as shown on television monitor 28. It will be appreciated and understood that as the roulette wheel 52 rotates and the roulette ball spins about the rim of wheel 52 in the opposite direction to the direction of rotation, the ball will not be visible on television monitor 28. However, the instant the ball drops into a numbered slot on wheel 52 it will suddenly appear on the screen at that instant, thereby providing additional thrill and excitement for the players of the game.

For completeness, also shown in FIG. 3 are housing 16 for the electronic transmission circuitry, top ball bearing assembly 18 for supporting the rotatable camera assembly, horizontal support 20, horizontal support 24, vertical support 26, electrical signal collector ring wheel 38, lower ball bearing assembly 42, camera housing 44, camera lens 50, camera 54 and set screws 56 for providing for affixing the camera securely within housing 44.

FIG. 4 shows in detail the mechanisms involved in transmitting the images taken by the rotating camera into the fixed assembly supporting structure and thence to the television receiver. Camera lens 50 on camera 54 is focused, as stated previously, on the roulette wheel below. Camera 54 and the television receiver are both preferably color units. While camera 54, wheel 14 and housing 44 are all affixed to and rotating with axle 36 through ball bearing means 42 and 18 respectively, and this rotation is adjusted to substantially coincide with the rotational speed of the roulette wheel, a substantially still image of the roulette wheel is obtained by camera 54. The camera signals are transmitted via wiring 66 extending through the center of hollow axle 36 and terminating at collector rings 58, preferably copper, embedded in collector wheel 38. Collector wheel 38 is also preferably made of nylon or polyethylene or other like nonconducting plastic material. Each camera wire or power source wire has an individual collector ring 58 connected therewith. Electrical signals from the rotating collector rings 58 are transmitted to stationary brushes 60, one brush per ring, held in place by nonconducting support 40, each brush being connected to respective wire 62, shown in the broken away section in FIG. 4, each wire 62 being used to transmit a signal from the rotating camera to the stationary monitor or power supply or vice versa.

For completeness in describing FIG. 4, also shown therein are support members 20, 22 24 and 26 containing wiring 62 and directing the wiring to cabinet 30, electronic assembly housing 16, retainer ring 64 for supporting collector ring 38, retainer ring 68 for supporting and affixing camera 50 and housing 44 to axle 66, counterweights 70 affixed by set screws 46 to provide for balanced rotation of wheel 14 and the camera assembly and screws 72 for affixing wheel 14 to camera housing 44.

Also shown in FIG. 4 is an alternative embodiment for rotating the wheel 14 and camera assembly wherein a direct current motor drive synchronized with the rotation of the roulette wheel is used to control the rotational speed of the camera by means of gear reducer M.

FIG. 5 is taken along line 5—5 of FIG. 4 and shows housing 16 in which collector ring wheel 38 rotates, being affixed to rotating axle 36 and having collector rings 58 embedded therein.

FIG. 6 is taken along line 6—6 of FIG. 4 and shows the wheel 14 for providing rotation of the camera assembly and the location of camera lens 50, camera 54, and camera set screws 56. Counterweights 70 and set screws 46 provide rotational balance for the system. Screws 72 are used to affix wheel 14, which preferably is of transparent plastic, to camera housing 44 as shown. Cross bracket 73 provides further bracing for camera 54. Supports 24 and 26 are provided for completeness.

FIG. 7 shows the invention herein wherein television monitors 28A are used at locations remote from roulette table 2 to view the action of the roulette wheel.

The invention as thus described provides apparatus for viewing the ball in an otherwise conventional game of roulette at the very instant the ball drops into a numbered slot in the roulette wheel during play of the game.

Figure 8:
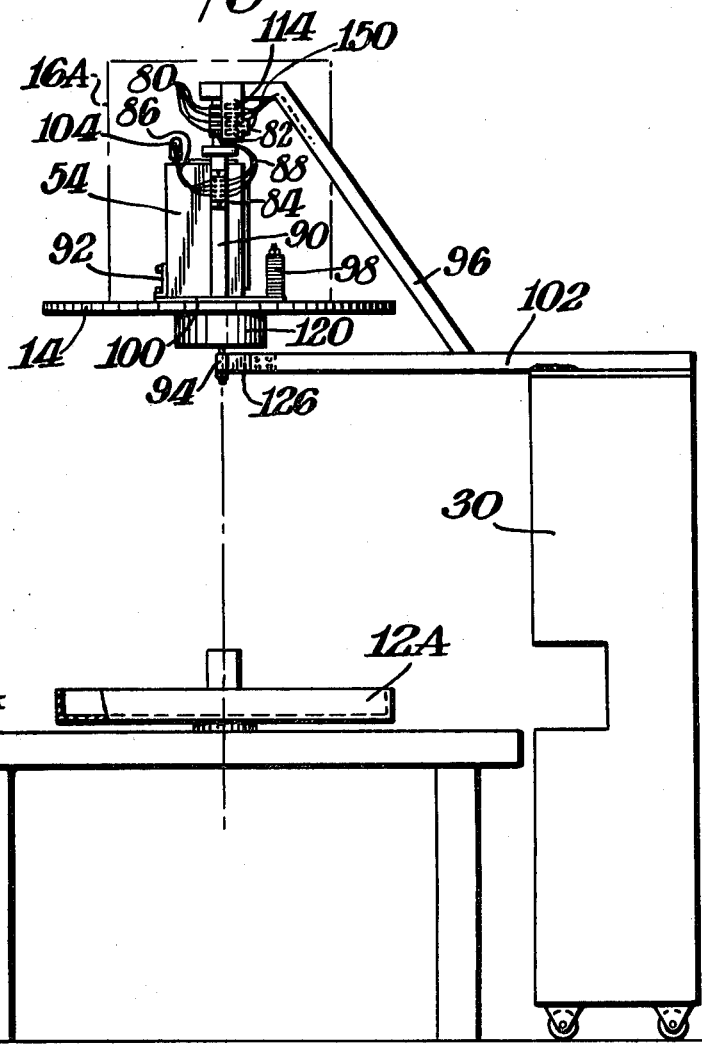
FIG. 8 is a side elevation of a preferred embodiment of this invention monitoring a rotating graphic display.

FIG. 8 depicts, in side elevation, a preferred embodiment for use of the apparatus of this invention. Therein is shown a rotating graphic display platform 12A upon which virtually any graphic display may be placed. The rotating platform 12A is supported on stationary table 2A. It is to be understood that rotating platform 12A in this preferred embodiment could be the roulette wheel 52 of FIG. 2. Television camera 54 is shown mounted on base plate 100 being secured thereto by support bracket 92, the base plate being secured to rotatable wheel 14. The entire assembly is supported by upper support bracket 96 and main support bracket 102, mounted as shown on the television monitor cabinet 30. Counterweight 98 is used to provide rotational balance to the system. The main bearing assembly contained in bearing housing 94 will be described in detail below. Camera housing 16A is shown in phantom so that interior detail can be seen.

The camera 54 is focused upon the rotating object to be viewed on platform 12A and the camera assembly is rotated at the desired viewing rotational speed by rotating wheel 14 at that speed. The signals from camera 54 are transmitted to the television receiver located in cabinet 30 in the following way. The signals from camera 54 are transmitted from camera terminal connector 104 through wires 86 to terminal block 84 located on camera support bracket assembly 90. Wires 88 connect the terminal block 84 to electrical contacts which are electroconductive bands 80 mounted upon a nonconductive sleeve 110 mounted upon vertical shaft 112. Electrical switches 82 have precision spring-loaded wiper arms 83 which contact bands 80 during rotation of the assembly and receive the signals therefrom. The signals are transmitted from switches 82 to the television monitor through power cords 150, located within the hollow supporting brackets 96 and 102.

Figure 9:
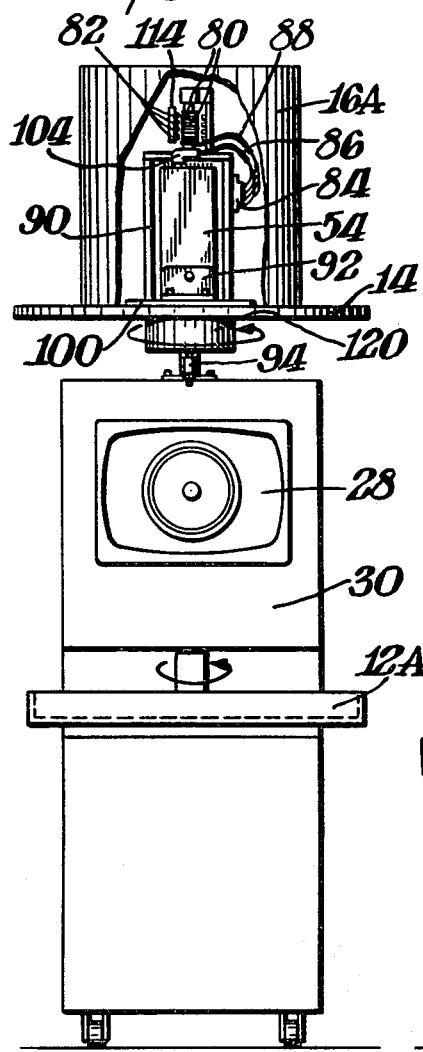
FIG. 9 is a front elevation of the preferred embodiment of FIG. 8.

FIG. 9 shows a front elevational view of the preferred embodiment of FIG. 8. Therein the camera housing 16A is shown partially cut away to show the camera and electrical assembly inside. Table 2A is omitted for clarity. Rotating platform 12A is shown rotating with camera assembly and wheel 14 by the arrows as indicated. Television monitor 28 is shown mounted in cabinet 30. Camera 54 is mounted on base plate 100 and secured thereto by bracket 92 and support brackets 90.

Signals from camera 54 are transmitted continuously to monitor 28 from camera terminal connector 104 through wires 86 to terminal block 84, then through wires 88 to band contacts 80 where they are picked up by wiper arms 83 on switches 82 and sent through power cord 150, not shown, to monitor 28. Bracket 114 is used to support the switches 82.

FIG. 10 shows a top plan view of the preferred apparatus described above, wherein the camera assembly is supported on cabinet 30 by support members 102 and 96. Rotating wheel 14 supports camera 54, housing 16A, support plate 92, base plate 100, and counterweight 98, and shows the electric components including camera terminal connector 104, wires 86, terminal block 84, wires 88, and switches 82.

FIG. 11 shows an enlarged view of the details of the camera, electronics and bearing assemblies of this preferred embodiment. Camera 54 is held in place by mounting bracket 92 secured to base plate 100 by bolts 116. Bolts 118 secure plate 100 to rotatable wheel 14 and bolts 142 secure camera support 90 to base plate 100.

Camera lens 50 is focused upon an object below, and the image obtained on the monitor when the camera is rotating is not significantly affected by support bracket 122, lower vertical assembly shaft 124 and the lower bearing assembly. Camera housing 120 is shown cut away to expose the lens 50, etc.

In FIG. 11, the signals from rotating camera 54 are transmitted from camera terminal connector 104 via wires 86 to terminal block 84 mounted on support 90. Wires 88 carry the signals from terminal block 84 to contact bands 80 mounted upon sleeve 100, in turn affixed to upper shaft 112. As the camera 54 rotates, the electrical signals are transmitted from the rotating band contacts 80 to stationary switches 82 by means of the wiper arms 83. From switches 82 the signals pass to the power cord 150, then to the television monitor. Switches 82 are mounted upon bracket 114 as shown. The upper bearing assembly into which upper vertical shaft 112 extends comprises housing 108 and needle bearings 106 contained in upper support bracket 96. The two-pointed vertical arrow above the assembly simply indicates that the entire assembly can be adjusted vertically as desired.

Referring to the lower portion of FIG. 11, the lower bearing assembly is shown which is a key to this invention. The lower bearing assembly is shown mounted in housing 128 in lower bearing support 126 attached to main support bracket 102. Lower vertical assembly shaft 124 is supported by upper bearing shaft 136 resting upon ball bearings 140, which in turn rest upon lower bearing shaft 134 connected to vertically adjustable screw 130, held in place by lock nut 132. The two-pointed arrow again simply indicates that the entire assembly can be adjusted in the vertical direction as desired. Ball bearings 140 are arranged within needle bearings 138 located about the periphery of the ball bearings as indicated.

FIG. 12 shows a bottom plan view of the bearing and camera assemblies of this invention. Therein are included main support bracket 102 supporting lower bearing assembly support 126 holding bearing housing 128 having adjusting screw 130 and lock nut 132. Lower support bracket 122 is shown supporting camera 54 and lens 50, this bracket being attached to plate 100. Lens housing 120 is shown attached to plate 100 by means of bolts 142 and wheel 14 is attached to plate 100 by bolts 118. For completeness, camera 54 and support bracket 92 are shown in phantom.

FIGS. 13, 14 and 15 show preferred bearing assemblies which are keys to this invention. FIG. 13 shows a combination needle bearing/ball bearing assembly. In this embodiment, the lower, vertical camera assembly shaft 124 supports bracket 122 on which the camera assembly is placed. Shaft 124 is connected to upper bearing shaft 136 which extends into bearing housing 128 and rests upon upper ball bearing 140. The lower end of shaft 136 is concave so as to adapt substantially to the shape of the ball bearing 140. Upper ball bearing 140 rests upon lower ball bearing 140 as shown, which rests upon lower bearing shaft 134 which has a concave upper end so as to adapt substantially to the shape of ball bearing 140. Bearing shaft 134 is connected to adjustable screw 130 which provides for vertical adjustment of the bearing assembly. Lock nut 132 is provided to secure the system at the desired position. Around the periphery of ball bearings 140 are located needle bearings 138 oriented vertically as shown. These needle bearings preferably have chamfered ends 146 as indicated, and ride in channels 148 as indicated. The gap indicated by "A" in FIG. 13 provides for extremely low bearing friction and is preferably in the range of about 0.005 to about 0.006 inches wide.

An alternative preferred bearing assembly is shown in FIG. 15. That embodiment uses a double set of vertical needle bearings 138 as shown. In FIG. 15, upper bearing shaft 136 rests upon ball bearings 140, the lower of which sets on the concave upper end of lower shaft 132, attached to screw 130 fixed in position by lock nut 132. The needle bearings 138 preferably have chamfered ends 146 as shown and ride in channels 148 as indicated.

FIG. 14 is taken along line 14—14 of FIG. 13 and shows a cross-section of shaft 136 positioned within needle bearings 138, all within housing 128. The preferred gap "A" is shown as well as the preferred chamfered ends of bearings 138.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow. In particular, the apparatus for viewing rotation of a roulette wheel is also useful for continuously viewing a rotating graphic display of virtually any type.

I claim:

1. A low friction, vertical bearing assembly comprising:
   (a) an upper, substantially vertical load-bearing shaft extending into
   (b) a bearing housing containing two ball bearings, one ball bearing being oriented above and in contact with the other in said housing, said upper shaft having a lower, concave end resting upon the top of said upper ball bearing, the concave end being substantially of the contour of said ball bearing, said lower ball bearing resting upon
   (c) a lower, substantially vertical load-bearing shaft which has a concave upper end, the concave end being substantially of the contour of said lower ball bearing, and
   (d) a plurality of needle bearings contained within said housing and oriented substantially vertically around the periphery of said ball bearings and in contact therewith,
   whereby a bearing assembly is provided having extremely low rotational friction.

2. The bearing assembly of claim 1 having a vertical gap between said upper, vertical load-bearing shaft and said vertical needle bearings, said gap distance being in the range of about 0.005 to about 0.006 inches.

3. The bearing assembly of claim 1 having two sets of vertically oriented needle bearings contained within said housing, an upper set located around the periphery of said upper ball bearing and a lower set located around the periphery of said lower ball bearing.

* * * * *